June 29, 1965  F. SCHLEICH ETAL  3,192,318
METHOD AND APPARATUS FOR THE MACHINING OF MATERIAL
BY MEANS OF A BEAM OF CHARGE CARRIERS
Filed Sept. 6, 1960

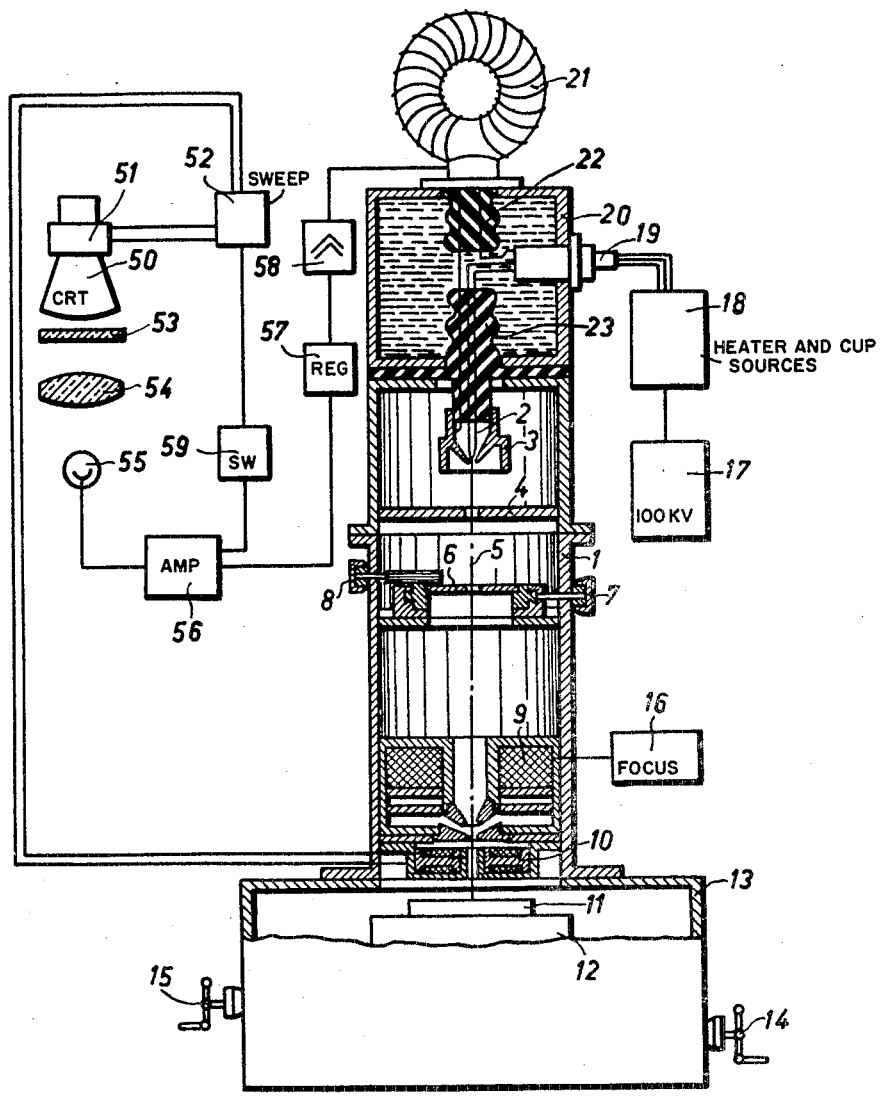

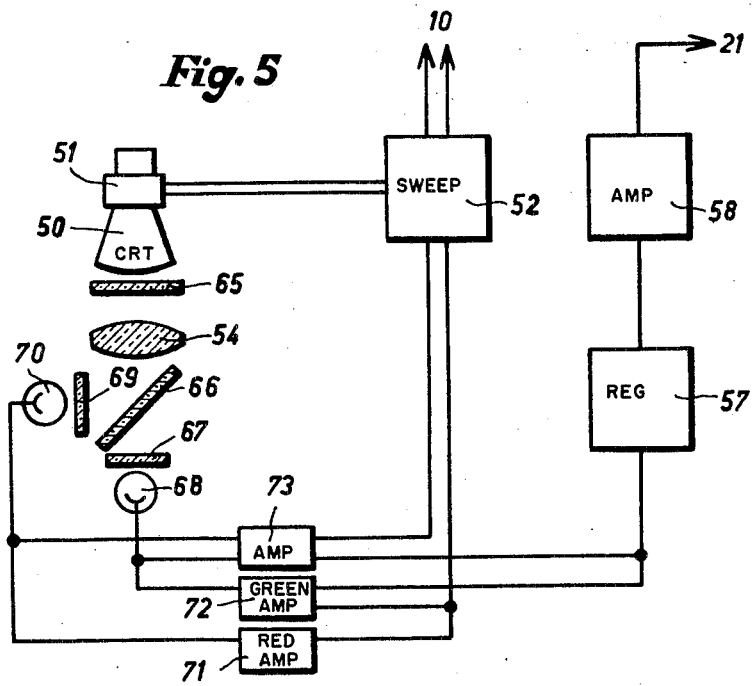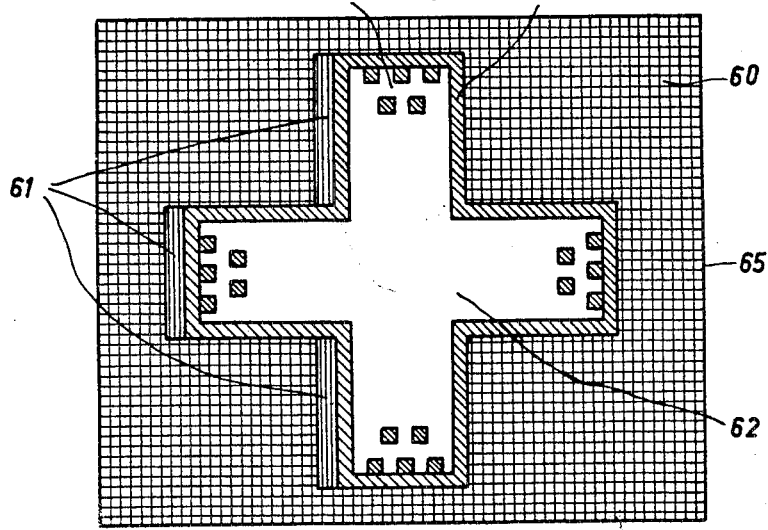

INVENTORS
FRITZ SCHLEICH
DIETRICH HOFFMEISTER
JUSTUS SIEKNKNECHT
KARL HEINZ STEIGERWALD

ATTORNEYS

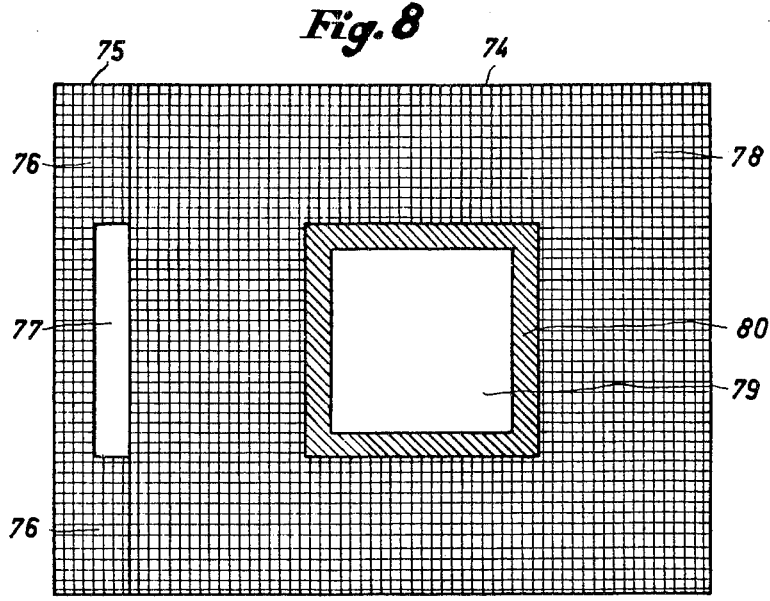
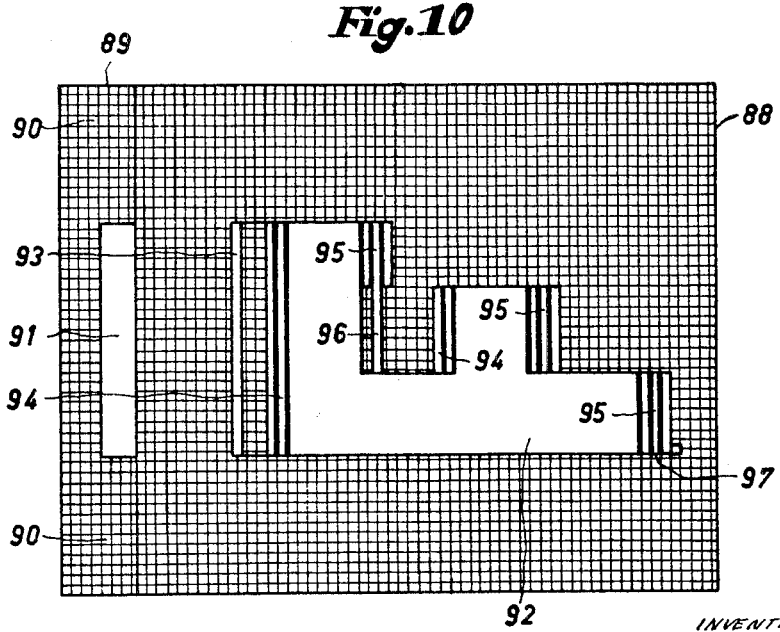

United States Patent Office 3,192,318
Patented June 29, 1965

3,192,318
METHOD AND APPARATUS FOR THE MACHINING OF MATERIAL BY MEANS OF A BEAM OF CHARGE CARRIERS
Fritz Schleich, Unterkochen, Wurttemberg, Dietrich Hoffmeister, Oberkochen, Wurttemberg, and Justus Sienknecht and Karl Heinz Steigerwald, Heidenheim (Brenz), Wurttemberg, Germany, assignors to United Aircraft Corporation, East Hartford, Conn., a corporation of Delaware
Filed Sept. 6, 1960, Ser. No. 53,939
Claims priority, application Germany, Sept. 4, 1959, Z 7,524; June 1, 1960, Z 8,043
23 Claims. (Cl. 178—6.8)

This invention relates to an improved method and apparatus for the machining of material by an impinging beam of charge carriers in which the beam intensity, position of beam impingement and rate of beam movement is controlled in response to scanning of master drawings.

Apparatus for working material by a beam of charge carriers is known to the art. In such apparatus, the material to be worked is bombarded with the charged particles or charge carriers to heat the material and evaporate the material at the place of beam impingement.

The energy density of the beam must be maintained sufficiently high to provide rates of evaporation and concomitant rates of material working at practically acceptable levels.

In applications, such as drilling of holes, the beam of charge carriers can be focused to bombard the area to be worked uniformly. The intensity distribution across the worked area should, of course, be rectangular, i.e. should drop off rapidly to zero at the edges of the area to be worked from the high value necessary for machining.

However, as the area to be worked increases in size, uniform distribution of the energy on the area has the disadvantage that increasingly larger regions about the area to be worked are subject to thermal stress due to heat conduction through the material. Thus undesirably large layers are melted at the edges and below the worked area, increasing the losses and disturbing the accuracy of the machining.

In U.S. Patent 2,989,614, for Method and Device for Working Materials by Means of a Beam of Charged Particles assigned to the assignee of the present invention, there is disclosed a method of working material in which an intermittently acting beam of charge carriers, the working cross-section of which is smaller than the surface of the material to be worked, passes over the place of working. In this method, the beam of charge carriers is moved in predetermined manner in jumps over the working place in such a manner that surface elements which are worked immediately after one another are separated by a distance which is greater than the diameter of such a surface element, over which distance the beam is disconnected or acts only very slightly on the material. The entire working place will finally be composed completely of a large number of adjoining worked surface elements.

This method of working is in itself universally applicable and can be adapted to all conditions. However, an apparatus for the carrying out thereof is very expensive since there is required here, in order to control the beam of charge carriers, an instrument for the digital control of the deflection values for the beam of charge carriers and the operating values for the beam generating system, which instrument consists of a program register and the corresponding decoders.

The object of the present invention is to provide a method of working material which requires a substantially less expensive device to carry it out and which nevertheless can be adapted to a certain extent to changing conditions in the working of material.

It is a further object of this invention to provide an improved apparatus to control the beam intensity, position of beam impingement, and rate of beam movement of charge carriers beam apparatus in response to a master drawing.

The invention thus relates to a method for the working of material by means of an intensity controlled beam of charge carriers, the working cross-section of which is smaller than the area of the material to be worked, and the invention is characterized by the fact that the beam of charge carriers is moved over the workpiece synchronously with a scanning beam, which is deflected in a scanning raster over a master drawing, the video pulses supplied by the scanning beam controlling the intensity of the beam of charge carriers impinging the object to be worked.

As scanning beam there is either used a scanning beam of a television camera or the traveling spot of a television flying spot scanner. The beam of charge carriers which serves for the working of the material therefore describes on the object which is to be worked a raster which is synchronized with the raster described by the scanning beam of the television system. The video pulses supplied by the television system correspond to the bright-dark distribution in the drawing to be reproduced on the workpiece. By means of these video pulses, the intensity of the beam of charge carriers is controlled so that this beam transmits the light-dark distribution of the drawing onto the object which is to be worked. It is readily possible to develop the method in such a manner that light values of the copy to be transmitted correspond to the light values of the beam of charge carriers. The method can also be so developed that the light values of the copy to be transmitted correspond to dark values of the beam of charge carriers.

In the new machining method, the beam of charge carriers in order to work on a layer of the material to be machined is guided several times over the workpiece in such a manner that during each scan the beam impinges within the working place only on a predetermined number of places which are separated from each other, and that as a result of all scans the entire surface is worked. The distribution of the beam energy over the working place is regulated during each scanning process via a register. The beam of charge carriers is in this connection periodically released by the register during a predetermined number of pulses and blocked during a predetermined number of subsequent pulses, the pulses which act during one scanning process being suppressed during the next scanning process. It is advantageous for the surface elements worked during each scanning process to be selected as far apart from each other as possible.

It is possible to set the register in such a manner that in each case it permits the passage of only one pulse and blocks the beam during a plurality of subsequent pulses. However, it is also possible to adjust the register in such a manner that entire groups of pulses are covered and are used for the machining in accordance with a predetermined sequence.

By the measure which has just been mentioned, the machining time is increased as compared with the normal television control of a beam of charge carriers, but the advantages obtained are so substantial that this increase in time can be readily tolerated. These advantages reside in the fact that the energy which is introduced can be divided up in accordance with thermal viewpoints so that the material is removed for all practical purposes in layers without the regions of material adjoining the actual point of working of the material being subjected to intolerably high thermal stresses. Furthermore, a very high precision of the machining of the material can be obtained. Thus the new method of machining material affords the possibility of carrying out millings of high precision in thick materials with a relatively simple beam control.

Furthermore, the new method of machining allows adjusting the beam energy which impinges upon each surface element of the working place during each scan. This adjustment is advantageously effected via information contained in the master picture. Thus, by suitable development of the master picture, it is possible in a very simple manner to obtain an even greater adaptation of the new method of machining the material to the thermal conditions of the machining of material.

The beam energy is advisedly effected, with constant beam modulation, by regulating the beam current or, in the case of so-called flying spot scanning, by regulating the speed of the movement of the beam. In scanning the master picture by means of a television camera, the regulation of the beam energy is advisedly effected in the manner that during the machining process, the television camera is offered in rapid succession a plurality of pictures which are of such a nature that the machining takes place in a plurality of steps which are adapted to the thermal requirements.

It is of particular advantage to control the beam of charge carriers in such a manner that there is an accumulation of energy at the edges of the area to be machined. In this way the heat loss through conduction at these places is compensated and the edge of the area to be worked is sharply defined. In addition to the heat loss through conduction, compensation for the reduction of beam intensity due to the angle of impingement at the edges may be compensated.

The said control of the beam of charge carriers is advantageously effected in this connection by a suitable development of the master picture, or, as described further below, most simply by a suitable development of the apparatus for the machining of material.

Another improvement of the new method of machining material can be obtained by keeping the so-called "dead times" as short as possible, i.e., the times during which the beam of charge carriers is conducted over the parts of the master picture which do not belong to the actual machining pattern proper. This result is achieved in the manner that by a suitable development of the master picture, the beam of charge carriers is moved faster over all raster points located outside the place of machining than it is over the raster points located within the place of machining.

The new machining process furthermore makes it possible to compensate readily for errors caused by the transmission and/or deflection elements. For this purpose, it is merely necessary to develop the picture to be transmitted in such a manner that it contains these defects with a negative sign.

The new machining process can be used with particular advantage, not only for the machining purposes already mentioned, but also for the solving of special problems in welding and soldering.

It is already known that two work pieces can be welded or soldered together by means of a beam of charge carriers, the beam being guided along the place of weld. If now, for instance, an opaque cover plate is to be welded together with a subjacent structural element of any desired shape, it is necessary to move the beam of charge carriers on the cover plate in a manner corresponding to the contours of the structural element. This is advisedly done in the manner that an X-ray transmission photograph of the structural parts to be welded is used as master picture for the television system. In this case, therefore, the beam of charge carriers is so controlled in accordance with the picture given by the X-ray photograph that it gives off energy only when the structural element lies below its point of impingement on the cover plate.

The apparatus for carrying out the new method consists of a known instrument for the machining of material by means of a beam of charge carriers, combined with a known device for the television scanning of a master picture. The output of the television system which supplies the deflection currents is coupled with the deflection coils of the instrument serving for machining the material by means of a beam of charge carriers, while the output of the television system which supplies the video signals is coupled with the elements which determine the beam intensity of the beam of charge carriers.

If all gray values of the picture to be transmitted are converted into corresponding intensity values of the beam of charge carriers serving for the machining of the material, it is advisable to couple the output of the television system which supplies the video signal, by means of an amplifier and a high voltage isolating transformer with the modulator electrode of the beam generating system (electron gun) of the charge carrier beam apparatus.

In many cases it is entirely sufficient if only black-white signals are transmitted to the charge-carrier-beam instrument. In this case, it is necessary to provide within the charge-carrier beam instrument two diaphragms located behind the beam-generating system as seen in the direction of the beam, between which diaphragms a deflection system is arranged. The output of the television system which supplies the video signal is then in this case coupled via an amplifier with said deflection system in such a manner that the beam of charge carriers only passes through the opening of the lower diaphragm when the television scanning beam strikes a picture element which is to be transmitted.

In order to solve special tasks, and to satisfy the thermodynamic conditions upon the cutting of special profiles, it is advantageous to deflect the beam of charge carriers in such a manner in its rest position that it does not pass through the lower diaphragm. Furthermore, in this case the output voltage of the amplifier serving to amplify the video signals is selected sufficiently great that the beam of charge carriers is deflected upon the occurrence of a video signal out of its rest position to such an extent that after passing over the diaphragm aperture, it again strikes the diaphragm and is thus blocked off. The result is therefore thus obtained that for instance upon the transmission of a line picture, charge carrier beam pulses impinge upon the object to be machined only at the edges of said line. An accumulation of energy density at the edges of the place of machining thus takes place.

In order to adapt the machining process to the thermodynamic conditions, a register which is coupled with the output of the television system supplying the video signal serves to block and trigger the charge carrier beam generating system in accordance with a predetermined program.

In many applications it is advantageous to provide a flying spot scanner, actuating a photoelectric cell through the master drawing. Such an apparatus affords the possibility of regulating the scanning speed in a relatively simple manner. For this purpose, there is provided with the television scanning system a device for regulating the scanning speed as a function of given command pulses supplied by the photoelectric cell.

In this connection it is particularly advantageous to make the master picture in several colors and to provide a plurality of photoelectric cells, the spectral sensitivity of which is adapted to the colors of the master picture. With these photoelectric cells, there are coupled switch means which serve to regulate the scanning velocity and/or the intensity of the beam of charge carriers.

The master picture is advisedly made in two colors. As a result of this, it is possible to produce a total of four command pulses for regulating the scanning speed and the beam energy.

It is of course also possible to make the master picture of a single color. This has the advantage of extremely simple construction and the possibility of using practically any scanning tube, but it is uneconomic insofar as when using two photoelectric receivers, only three different command pulses can be obtained. When the master picture is in two colors, the two colors must be so selected that on the one hand they are far enough apart spectrally or have relatively narrow path ranges and on the other hand that they are contained in the emission of the fluorescent-screen radiations. In this connection, there are advisedly placed in front of the two photoelectric cells filters which make the cells selectively sensitive to the colors which pass through.

A colored picture has the advantage of maximum simplicity in the production of the program. Such pictures can be made by very simple means by unskilled personnel and accordingly offer the possibility of very extensive programming.

Another possibility for regulating the beam energy impinging upon each surface element of the working place consists in arranging on the picture edge of the master picture to be scanned a picture frame which is so developed that upon scanning it supplies command pulses which determine the movement of the beam. In this connection, it is advisable to provide also the edges of the figure contained in the master picture with picture frames which upon the scanning supply command pulses which determine the movement of the beam and/or the energy of the beam. The picture frames can consist of a series of light-dark places succeeding one another in the scanning direction, but they may also be formed of a series of consecutive colored spots. In particular it is also possible to form the picture edge frame of a sequence of light-dark points and develop the figure edges in color.

The invention will be more clearly understood by reference to the following description, taken in combination with the accompanying drawings, of which:

FIG. 3b is a plan view of the area worked by the charge carrier beam on the object to be machined by an apparatus in accordance with FIG. 2 from the master drawing of FIG. 3a;

FIG. 4 is a partially sectioned view of an apparatus constructed in accordance with the invention for the machining of material by means of a beam of charge carriers in which a so-called flying spot scanner is used for scanning the master picture;

FIG. 5 is a schematic view of a part of the apparatus shown in FIG. 4 for use with a master drawing in two colors;

FIG. 6 is a plan view of a typical two-color master picture;

FIG. 8 is a plan view of a single-color master picture provided with a picture frame;

FIG. 10 is a plan view of a master picture consisting solely of light and dark spots.

Figure 1:
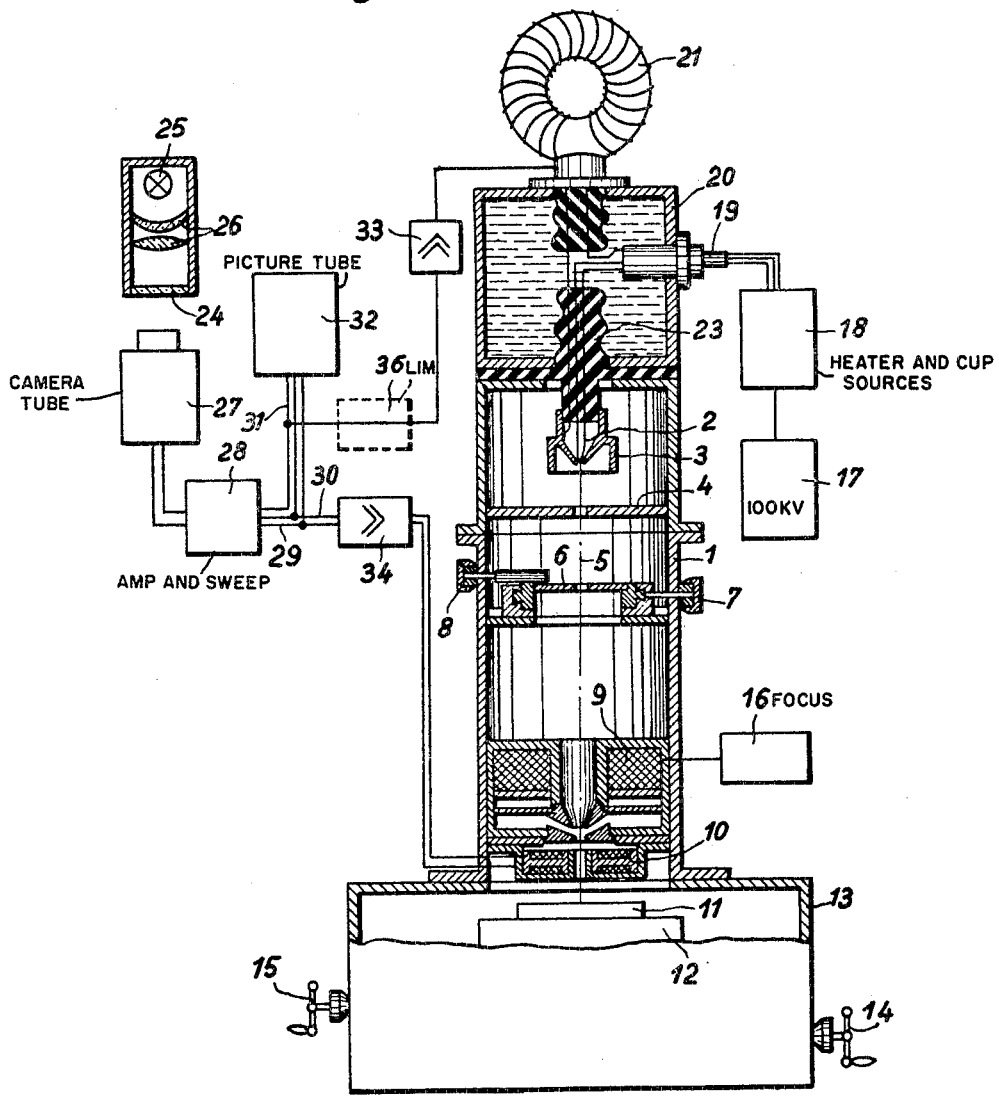
FIG. 1 is a partially sectional view of an apparatus constructed in accordance with the invention for the machining of material by means of a beam of charge carriers, in which circuit components are illustrated schematically.

In FIG. 1, there is shown a charge carrier beam apparatus comprising a vacuum vessel 1 in which there is arranged a beam generating system (electron gun) consisting of the cathode 2, the focusing cup 3 and the anode 4. For the further shaping of the electron beam 5, there is provided a diaphragm 6 which can be adjusted by means of the knobs 7 and 8. An electromagnetic lens 9, the current supply unit of which is designated 16, serves for focusing the electron beam onto the workpiece 11 which is to be machined. The workpiece 11 is arranged in a chamber 13 which is also under vacuum on a table 12 which can be moved from left to right or vice versa by means of a spindle 15. Another spindle 14 serves to displace the workpiece at right angles to the plane of the paper.

Between the electromagnetic lens 9 and the workpiece 11, there is arranged an electromagnetic deflecting system 10 which serves to deflect the elctron beam 5 in the plane of the paper and at right angles to the plane of the paper. The deflection system 10 consists of electromagnetic deflection coils arranged to deflect the beam along mutually perpendicular axes. These coils are so developed that upon the feeding of corresponding deflection currents, for instance sawtooth deflection currents, they deflect the electron beam 5 in such a manner that it describes an undistorted raster on the surface of the workpiece 11.

In the apparatus 17, there is produced a high voltage of for instance 100 kilovolts, which is fed by means of a high voltage cable provided with a grounded sheathing to the apparatus 18. This apparatus serves to produce the adjustable cathode heater voltage and the adjustable focusing-cup voltage. These voltages are introduced into the oil-filled container 20 by a 3-conductor high voltage cable 19 provided with a grounded jacket. The heating voltage lying on a potential of for instance −100 kv. is fed directly to the cathode 2. The focusing-cup voltage of for instance −101 kv. is fed through the insulator extension to the secondary winding of the high voltage insulating transformer 21 and passes from there directly to the focusing cup 3. The voltage of the focusing cup is so adjusted that the beam generating system (electron gun) is biased to cutoff in the quiescent state.

Into the oil filled container 20, there extend the insulator extension 23 of the insulator bearing the beam generating system, the three-conductor high voltage cable 19, and the insulator extension of the high voltage isolating transformer 21.

The high voltage isolating transformer 21 consists of an annular core of fine laminations upon which is wound the primary winding. This annular core is embedded in an annularly cast casting resin, the cast resin ring carrying the secondary winding of the transformer. The primary and secondary windings of the transformer 21 are thus insulated from each other with respect to high voltage, i.e., the secondary winding can lie at the high voltage fed to the beam generating system while the primary winding arranged on the cast resin ring is at ground potential.

A television camera 27 to which the necessary operating voltages are fed from the control 28 is provided for control of beam modulation. The video signal supplied by the camera 27 passes to the control 28 and is amplified there. The control 28 supplies, via the line 29, the deflection current serving for the vertical deflection, while the deflection currents serving for the deflection in horizontal direction are supplied over the line 30. The amplified video signal passes over the line 31 to a display unit 32 to which the necessary deflection currents are also fed. The display unit 32 therefore reproduces the picture photographed by the television camera 27.

The deflection currents are fed to an amplifier 34 and pass from there to the deflection coils of the deflection system 10. The video signals are fed to an amplifier 33 and pass from there to the primary winding of the isolating transformer 21. The manner of operation of the apparatus shown here is as follows: by means of a lamp 25 and an optical system 26, there is illuminated a picture 24 which is to be transferred to the workpiece 11. The picture 24 is converted by the television camera 27 into electrical signals which in their turn are converted back into picture signals in the monitor display unit 32. The deflection currents are fed to the deflection system 10 via the lines 29 and 30 so that the electron beam 5 thus describes on the surface of the workpiece 11 a raster which corresponds precisely to the raster described by the scanning beam of the television camera.

If the television camera 27 supplies a video signal, said signal is fed via the amplifier 33 to the isolating transformer 21. The video signal is applied to the focusing cup 3 through the transformer and reduces the bias of said electrode by an amount which corresponds to its intensity. Thereby the beam generating system is unlocked and an electron beam 5, the intensity of which is determined by the size of the video signal, reaches the workpiece 11. At the place determined by the deflection currents fed to the deflection system 10, the electron beam 5 produces a machining (working) effect.

It is readily seen that the intensity of the beam of charge carriers impinging on the workpiece 11 depends on the amplitude of the video signal. For this reason, it is possible to work the surface of the material in relief with the device shown in FIG. 1.

Figure 3A:
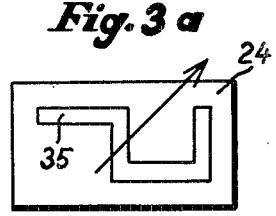
FIG. 3a is a plan view of a master drawing used in connection with the invention.

The picture 24 which is to be transmitted is shown by way of example in FIG. 3a. As shown in this figure, the picture consists of a bright line 35 on a dark background. Upon the transmission of the picture to the workpiece 11 there is thus produced on the surface of the workpiece a machined figure which corresponds precisely to the lines 35 of the picture 24. For example, the machining to be effected might be the removal of a layer of the surface of the material.

If the device shown in FIG. 1 is not to be used for the transmission of gray values for the mentioned relief working, a control member 36 consisting for instance of a thyratron is inserted in front of the amplifier 33, said control unit supplying a pulse of constant amplitude upon the arrival of a video signal of any strength. Instead of the thyratron, there can also be used a known circuit for limiting the amplitudes of video pulses to a constant value.

Figure 2:
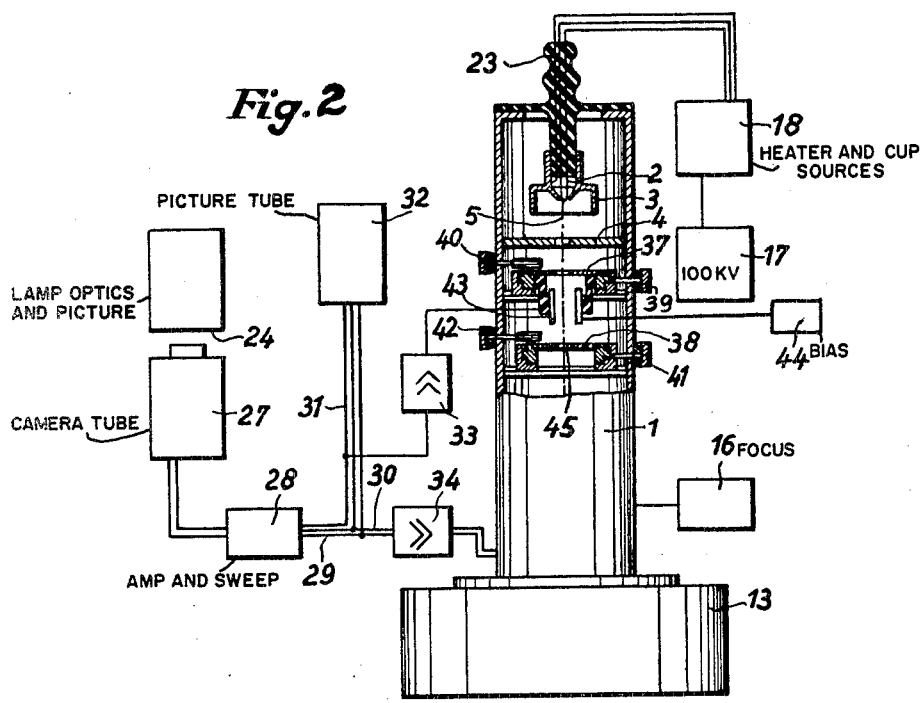
FIG. 2 is a partially sectioned view of another embodiment of an apparatus in accordance with the invention.

In the embodiment of the device according to the invention shown in FIG. 2, instead of the diaphragm designated 6 in FIG. 1, there are arranged between the anode 4 two diaphragms 37 and 38 which can be adjusted by means of the knobs 39, 40, and 41, 42 respectively. To the upper diaphragm 37, there is connected a pair of deflection plates 43 serving to deflect the electron beam 5 over the lower diaphragm 38.

In the embodiment shown here, the video signal amplified in the amplifier 33 is fed directly to the pair of deflection plates 43. This pair of deflection plates is not at high voltage so that in this embodiment the high voltage isolating transformer 21 is dispensed with.

In rest condition, i.e., in the absence of a video signal, there is applied via an apparatus 44 to the pair of deflection plates 43 such a voltage that the electron beam 5 does not pass through the aperture 45 of the diaphragm 38. Upon the occurrence of a video signal, the electron beam 5 is so deflected by means of the pair of deflection plates 43 that, as shown in FIG. 2, it passes through the aperture 45 of the diaphragm 38 and thus impinges on the workpiece 11 which is to be machined. As is readily evident, it is possible with the device shown in FIG. 2, with the indicated selection of the deflection voltage, to transmit merely black and white signals. It is possible and in many cases advantageous to make the output voltage of the amplifier 33 so large that the electron beam 5 upon the occurrence of a video signal is deflected so far from the rest position shown in FIG. 2 that after passing over the diaphragm aperture 45, it again strikes the diaphragm 38 and is thus blocked. In this case, therefore, in case of the transmission of a line picture, charge carrier beam pulses are released only at the picture edges.

If for instance the picture 24 shown in FIG. 3a is transmitted to the workpiece 11 by the transmission process described, the electron beam 5 describes on the surface of the workpiece 11 a line 46 which consists merely of the edge lines of the picture 35. For this purpose, it is, to be sure, necessary to arrange the picture 24 in such a manner that the scanning beam of the television camera tubes moves over the same in the direction indicated by the arrow.

Figure 3B:
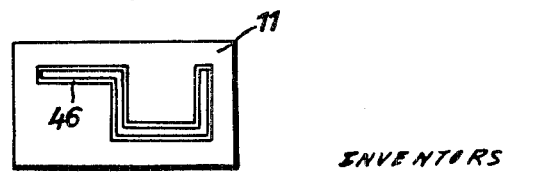

By the energy concentration which can be noted from FIG. 3b at the edges of the machining place, the thermodynamic conditions of the machining of material by a beam of charge carriers are taken into account. In this case with a line 35 corresponding to about 4 times the diameter of the beam, there is produced a uniform machining also of the region within the marginal line 46, since the energy which is radiated-in passes by heat conduction by way of preference into this region.

With the apparatus shown in FIG. 1, it is also possible to take the thermodynamic conditions into account. For this purpose, it is merely necessary to give the picture 24 the shape, shown in FIG. 3b, of a closed marginal line 46. Upon the transmission of the picture to the surface of the workpiece 11, there is then produced, for the reasons which have just been indicated, a machined groove which corresponds to the line 35 of FIG. 3a.

A further adaptation to the thermodynamic conditions of the machining of material is possible by not using merely an individual picture 24 but rather transmitting several master pictures developed in accordance with the special conditions. In this case, it is merely necessary to replace the apparatus shown in FIG. 1 for the illumination of the picture 24 as well as the television camera 27 by a television film scanning system, known per se. By means of such a system, pictures which follow each other in rapid succession can be scanned with utmost precision and transmitted to the workpiece 11.

In FIGS. 1 and 2 in order not to interfere with their clarity, a television camera 27 and an instrument for illuminating the picture 24 to be transmitted have been shown. It is, of course, possible to replace these parts by an ordinary commercial television slide scanner.

In FIG. 4, 50 is a cathode ray tube which is provided with deflection means 51. In generator 52, the deflection currents for the deflection means 51 are produced so that the electron beam of tube 50 describes a line raster on the fluorescent screen. The generator 52 is so connected with the deflection system 10 that the electron beam 5 is moved synchronously with the electron beam of the tube 50 and thus describes the same line raster on the surface of the workpiece 11. The light spot which moves on the fluorescent screen of the tube 50 in the form of a line raster is hereinafter called the "scanning beam."

A transparent master picture 53 is arranged in front of the cathode ray tube 50. The light passing through this master picture is focused by a lens 54 on a photoelectric cell 55. This photoelectric cell accordingly supplies an electric signal which corresponds to the picture information of the master picture 53.

The video pulses supplied by the photoelectric cell 55 are fed to an amplifier 56. From this amplifier, the video pulses pass to a register 57 which is, for example, so adjusted that upon the first scanning in the first lines it releases the first, tenth, twentieth, etc., picture spot while it suppresses all other intermediate video pulses. Upon the second scanning, the second, eleventh, twenty-first, etc. picture spots are released by the register 57 while all other picture spots are suppressed. The pulses passing through the register 57 are amplified in the amplifier 58 and pass from there to the high voltage isolating transformer 21. From there, they are fed to the control electrode, and unblock the beam generating system. Therefore, upon the scanning of the master picture 53, only a predetermined number of charge-carrier beam pulses arrive at the workpiece 11, these pulses striking the surface of the workpiece at points which are spaced far apart from each other. If the scanning process is repeated ten times in the example described, the entire machining place will finally be composed of a plurality of machined surface elements.

The generator 52 for producing deflection currents is so adjusted that it normally supplies deflection currents, the frequency of which are substantially above the frequency of the normal deflection currents used for television purposes. As soon as the scanning beam, however, impinges through the master picture 53 onto the photoelectric cell 55, a command pulse is fed via the amplifier 56 and a switch 59 to the generator 52, this command pulse bringing it about that it now supplies deflection currents of a considerably lower frequency. The result is obtained that the area outside of work area proper is scanned more rapidly than the work area scan.

FIG. 6 shows a two-color master picture which consists of an opaque portion 60, the red strips 61 arranged, seen in the scanning direction, in front of the edges of the figure to be machined, and the transparent cross 62. The edge 63 of the cross 62 is bordered in green and green-colored rectangles 64 are arranged at the end of the arms of the cross.

For the scanning of the two-color master shown in FIG. 6, there is used the device shown in FIG. 5. This device once again has the scanning tube 50 provided with the deflection means 51, as well as the generator 52 serving to produce the deflection currents. The light passing through the master picture 65 is split up into two parts by the semi-permeable mirror 66. A part of the light passes through the mirror 66 and arrives through the color filter 67 at the photoelectric cell 68. The filter 67 is so selected that the cell 68 responds only to light which passes through the green color regions of the master picture 65. The other part of the light which passes through the master picture is reflected by the mirror 66 and passes through filter 69 to the photoelectric cell 70. The filter 69 is so selected that the cell 70 responds only to light which passes through the red picture parts of the master picture.

The manner of operation of the device shown here is as follows. As long as no light passes through the master picture 65, i.e., as long as the scanning beam moves in the region 60 of the master picture 65, the beam generating system is blocked and the generator 52 supplies deflection currents of high frequency. As soon as the scanning beam enters the red region 61, the photoelectric cell 70 responds. The voltage supplied by this cell is amplified in the amplifier 71 and passes to the generator 52. This generator is caused by the incoming command pulse to supply deflection currents which have a lower frequency. The beam generating system continues to remain blocked. If the scanning beam now enters the green edge region 63 of the master picture, the photoelectric cell 68 responds. The voltage supplied by this cell is amplified in the amplifier 72 and passes from there on the one hand to the register 57 and on the other hand to the generator 52. The register 57 is connected by the incoming command pulse so that the beam generating system is unblocked. The generator 52 is caused by the incoming command pulse not to change the frequency of the deflection currents supplied by it. The generator 52 and the register 57 are so adapted to each other that the successive charge-carrier beam pulses overlap as long as the scanning beam moves in the green region 63 of the master picture 65.

Figure 7:
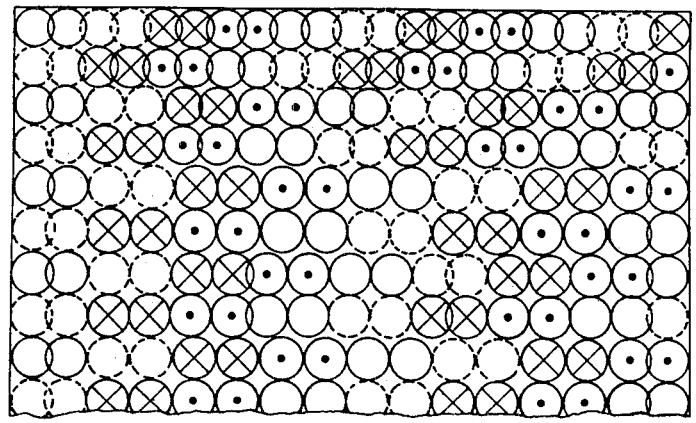
FIG. 7 shows the distribution of the charge-carrier beam pulses on a part of a workpiece.

The overlapping of the charge carrier beam pulses can be noted from FIG. 7. This figure shows a part of the surface 11 of the workpiece, and the charge carrier beam pulses impinging on said surface in their time and space sequence. The register 57 is so adjusted in the case of FIG. 7 that it permits the passage each time of two successive charge carrier beam pulses and blocks the charge carrier beam generating system during the next six pulses. Upon the first scanning therefore, only the pulses shown in solid line impinge on the work surface 11, while during the second scanning, those shown in dotted line impinge, upon the third scanning drawn with an x, and upon the fourth scanning those drawn with a dot in the center. After the fourth scanning, the entire figure to be machined is composed completely of a plurality of machined surface elements, in which connection an accumulation of energy occurs in the green picture region of the master picture 65.

As soon as the scanning beam falls through the white region 62 of the master picture 65, both cells 70 and 68 supply a voltage. This voltage is amplified in the amplifier 73 and passes on the one hand to the register 57 and on the other to the generator 52. The register 57 is caused by the incoming command pulse to continue the program of beam modulation which has once been set. The generator 52 on the other hand is induced by the incoming command pulse to supply deflection currents, the frequency of which is somewhat higher than the frequency of the deflection currents delivered in the green region 63 of the master picture 65. In this way the beam of charge carriers 5 is moved somewhat more rapidly in the white region 62 than in the green region 63 of the master picture, this movement taking place in such a manner that successive charge carrier beam pulses no longer overlap but adjoin each other. This also can be readily noted from FIG. 7.

FIG. 8 shows a master picture 74 which contains a picture frame 75. This picture frame consists of the two opaque regions 76 and of the transparent region 77. The actual master picture contains the opaque region 78, the transparent region 79 and the green edge region 80.

Figure 9:
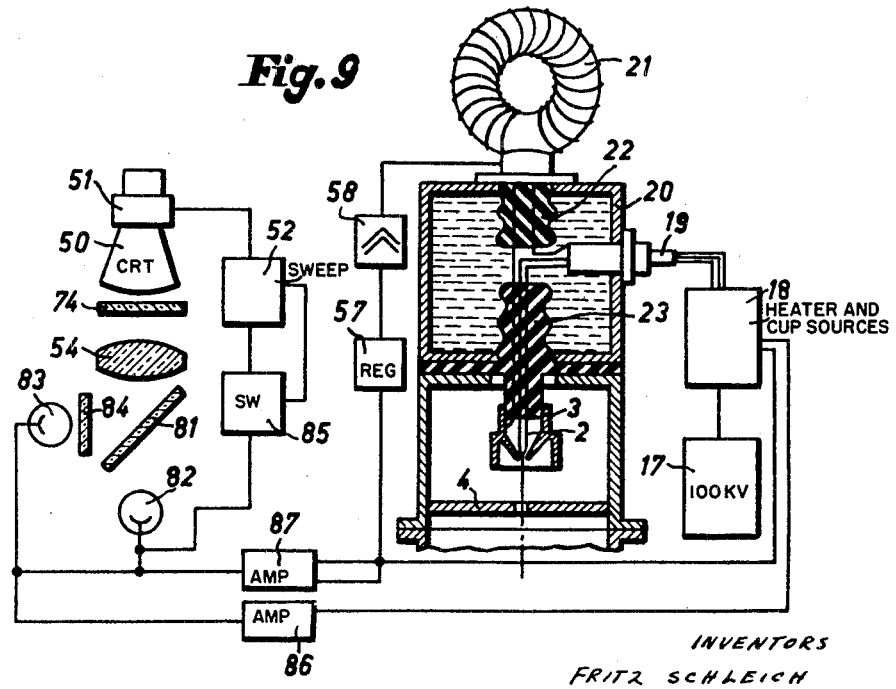
FIG. 9 is a partially sectioned view of an apparatus for the machining of material in which the master picture shown in FIG. 8 is used for controlling the beam.

For the machining of material with the use of the master picture 74 shown in FIG. 8, there is used the device shown in FIG. 9. In it there is once again provided a semi-permeable mirror 81 which splits up the light passing through the master picture 74 into two portions. Furthermore, there are provided two photoelectric cells 82 and 83, the cell 83 being so adapted by means of the filter 84 arranged in front of it that it responds merely to the green color region 80 of the master picture 74.

The manner of operation of the device shown in FIG. 9 is as follows. The scanning beam, upon scanning the master picture 74, first of all moves over the picture frame 75. As long as it moves in the black region 76 of this frame, neither of the photoelectric cells 82 or 83 receives light, and the generator 52 merely supplies the deflection current necessary to deflect the scanning beam in vertical direction. This means that the deflection current does not describe any picture line at all. As soon as the scanning light spot travels over the region 77 of the picture frame 75, the cell 82 supplies a command pulse of specific shape which via the switch 85 causes the generator 52 now to deliver also the current necessary for the deflection in vertical direction. The apparatus 85 is so coupled with the deflection generator 52 that it is automatically placed out of operation after a period of time which corresponds to the moving off of the picture frame 75. Accordingly, the generator 52 continues to supply both deflection currents when the scanning beam has left the picture frame 75 in the region 77 and enters the black region 78 of the master picture 74. As soon as the scanning beam now enters the green edge region 80 of the master picture 74, the photoelectric cell 83 receives light. The voltage supplied by this cell is fed, after amplification in the amplifier 86, to the apparatus 18 which serves to produce the bias voltage of the control electrode 3. The incoming command pulse causes the bias voltage of the control electrode to be reduced so that therefore the beam current of the charge carrier beam 5 reaches a specific given amount.

At the same time the voltage produced by the cell 83 is amplified in the amplifier and effects the connecting of the register 57.

As soon as the scanning beam passes into the white region 79 of the master picture 74, both cells 82 and 83 receive light and accordingly there is produced in the amplifier 87 a voltage which is higher than the voltage which is produced while the scanning beam is in the green picture region 80. This voltage passes on the one hand to the register 57 and causes said register to remain in operation. On the other hand, this voltage arrives at the apparatus 18 and causes a reduction of the bias voltage of the control electrode 3. Accordingly, the current intensity of the charge carrier beam pulses is smaller, as long as the scanning beam moves in the white picture region 79, than when the scanning beam moves in the green picture region 80.

FIG. 10 shows a master picture 88 consisting solely of a sequence of light-dark places. This master picture contains a picture frame 89 which surrounds the two regions 90 and 91. In the regions 90, the charge carrier beam is so controlled that it moves merely in vertical direction while in the region 91 the charge carrier beam is so controlled that it also experiences a deflection in horizontal direction.

Before or behind all the edges of the picture 92, there are arranged edge frames which consist of a sequence of light-dark places. The picture frame 93 produces a slow movement of the charge carrier beam in horizontal direction, while the picture frame 94 supplies the command pulse serving to place the register 57 in operation. The picture frame 95 supplies a command pulse which places the register 57 out of operation and causes the charge carrier beam immediately to move back to the start of the next line. The picture frame 96 supplies a command pulse which places the register 57 out of operation, but continues to move the charge carrier beam in horizontal direction. The combination 97 of the light-dark spaces arranged in the scanning direction at the end of picture 92 supplies a command pulse which blocks the register 57 and effects the immediate return of the charge-carrier beam to the start of the picture.

It is directly clear that the edge frames shown in FIG. 10 can be modified as desired, as long as they supply command pulses which can still be read and distinguished by the scanning beams. It is also possible, in place of the edge frames consisting of a sequence of light and dark places shown in FIG. 10 to select frames which consist of a sequence of color spots arranged one behind the other in the scanning direction.

As shown by the above embodiments, by a suitable development of the master picture, a very extensive programming of the machining is possible. Even with very simple means, as for instance in the case of FIG. 6, there can be obtained a programming which is extensively adapted to the thermal conditions of the machining of the material.

This invention may be variously modified and embodied within the scope of the subjoined claims.

What is claimed is:

1. In combination, a charge carrier beam apparatus for machining material, said apparatus having a beam generator and means to focus the generated beam on said material in impinging beam of small cross section dimension and high energy density, a master picture, a television scanner to scan said master picture and to generate a video signal responsive to the content of the picture on each position throughout the scan, means to deflect the beam of said apparatus synchronously with said scan, and means responsive to said video signal to modulate the beam intensity in accordance with the content of the scanned picture.

2. A combination according to claim 1 which includes a register to which the video signal is applied, said register being adapted for blocking and keying of the charge carrier beam generating system in accordance with a predetermined program with the elements of the charge carrier beam device determining the intensity of the beam.

3. A combination in accordance with claim 2 which includes means responsive to the video signal to change the bias voltage of the control electrode of the beam generating system as a function of given command pulses supplied by the television system.

4. A combination in accordance with claim 2 which includes a plurality of photoelectric cells, the spectral sensitivity of which is adapted to colors of a multicolor master picture and means responsive to the output of said photoelectric cells to regulate the scanning speed and the beam current of the charge carrier beam.

5. A combination according to claim 2 in which the master picture includes a picture frame arranged on the picture edge of the master picture to be scanned, which frame is so developed that upon scanning it supplies the command pulses which determine the velocity of movement of the beam.

6. A combination according to claim 5 in which the edges of the figure contained in the master picture are also provided with picture frames which upon scanning supply the command pulses which determine the beam movement and the beam energy.

7. A combination according to claim 6 in which the picture frames consist of a series of color points arranged one behind the other in the scanning direction.

8. A combination according to claim 6 in which the picture edge frames consist of a sequence of a series of areas of contrast to develop a distinctive video signal upon scan thereof and that the edges of the figure are in color.

9. A combination according to claim 5 in which the picture frames consist of a series of areas of contrast arranged one behind the other in the scanning direction to develop a distinctive video signal on scan thereof.

10. The method of machining a workpiece over an area of any shape thereon by means of an intensity controlled charge carrier beam, the working cross section of which is smalle rthan the area to be machined which consists of the steps of making a picture of the area to be worked on, scanning this picture, deflecting the charge carrier beam synchronously with said scan and modulating the intensitiy of the charge carrier beam in accordance with the content of said scanned picture.

11. The method according to claim 10 in which the charge carrier beam is so moved over the workpiece that upon each scanning process it enters into action within the area to be machined only at a predetermined number of points which are spaced apart from each other and that finally the entire area to be machined is completely composed of a plurality of machined surface elements, the distribution of the current pulses over the area to be machined being regulated via a register during each scanning process.

12. The method according to claim 11 which includes the step of allowing the charge carrier beam to impinge on the workpiece during a predetermined number of pulses and blocking the beam during a predetermined number of subsequent pulses, the pulses which enter into action upon one scanning process being suppressed upon the next scanning process.

13. The method according to claim 12 in which the distance between the surface elements machined during each scanning process are separated by a distance greater than the diameter of the charge carrier beam.

14. The method according to claim 10 which includes the step of regulating the beam energy impinging upon each surface element of the machining place during each scan.

15. The method according to claim 14 in which the beam energy is regulated in accordance with information contained in the picture.

16. The method according to claim 15 in which a plurality of pictures which are so developed that the corresponding distribution of the beam energy is obtained upon each scanning process are scanned in rapid succession during the machining process.

17. The method according to claim 14 in which the regulation of the beam energy is effected by regulating the beam current while holding the pulse modulation constant.

18. The method according to claim 14 in which the regulation of the beam energy is effected by regulating the velocity of the beam deflection while holding the pulse modulation constant.

19. The method according to claim 14 in which the charge carrier beam is so controlled that the energy concentration is highest along the boundaries of the area to be worked upon.

20. The method according to claim 10 in which the picture to be scanned is so developed that it compensates for errors caused by the transmission and deflecting elements said compensation including the introduction of distortion in the picture equal to, but opposite to the errors of detection and transmission.

21. The method according to claim 10 in which the beam is continuously modulated to produce relief machining of surfaces.

22. In combination, a charge carrier beam apparatus for machining material, said apparatus having a beam generator and means to focus the generated beam on said material in an impinging beam of small cross sectional dimension and high energy density, a first and second diaphragm positioned between said generator and said material, each of said diaphragms having an aperture positioned at the beam axis, a beam deflection system positioned between said first and second diaphragms, means to bias said deflection system so that the beam does not pass through the second diaphragm, a master picture, a television scanner to scan said master picture and to generate a video signal responsive to the content of the picture at each position throughout the scan, means to deflect the beam of said apparatus synchronously with said scan, and means responsive to said video signal for overcoming said bias to cause the beam to pass through said second diaphragm to impinge on said material.

23. A combination according to claim 22 in which the video signals applied to the deflection system are of such magnitude that the charge carrier beam, upon the occurence of a video signal, is deflected so far out of rest position that after passing over the diaphragm aperture, it again impinges on the diaphragm and is thus blocked.

References Cited by the Examiner
UNITED STATES PATENTS

| | | | |
|---|---|---|---|
| 2,455,532 | 12/48 | Sunstein | 250—201 |
| 2,516,069 | 6/50 | Newhouse et al. | 178—6.8 |
| 2,616,983 | 11/52 | Zworykin et al. | 179—100.3 |
| 2,680,200 | 6/54 | Hercock | 250—83.3 |
| 2,763,833 | 9/56 | Brumbaugh | 178—7.2 |
| 2,871,465 | 1/59 | Neilsen | 340—172.5 |
| 2,872,508 | 2/59 | Rose | 178—5.2 |
| 2,957,941 | 10/60 | Covely | 178—7.5 XR |
| 2,959,777 | 11/60 | James | 343—5 |
| 2,989,614 | 6/61 | Steigerwald | 219 |

DAVID G. REDINBAUGH, *Primary Examiner*.

MAX L. LEVY, ROY LAKE, *Examiners*.